United States Patent
Zhang

(10) Patent No.: US 11,697,154 B2
(45) Date of Patent: Jul. 11, 2023

(54) POLISHING METHOD FOR INNER WALL OF HOLLOW METAL PART

(71) Applicant: UNIVERSITY OF SCIENCE AND TECHNOLOGY BEIJING, Beijing (CN)

(72) Inventor: Baicheng Zhang, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 434 days.

(21) Appl. No.: 16/926,868

(22) Filed: Jul. 13, 2020

(65) Prior Publication Data

US 2020/0338640 A1    Oct. 29, 2020

Related U.S. Application Data

(63) Continuation of application No. PCT/CN2018/115884, filed on Nov. 16, 2018.

(30) Foreign Application Priority Data

Jan. 11, 2018  (CN) .......................... 201810026421.X

(51) Int. Cl.
*B22F 3/24* (2006.01)
*C25F 3/16* (2006.01)
(Continued)

(52) U.S. Cl.
CPC ............... *B22F 3/24* (2013.01); *B33Y 40/20* (2020.01); *C25F 3/16* (2013.01); *C25F 7/00* (2013.01); *B22F 2003/241* (2013.01)

(58) Field of Classification Search
None
See application file for complete search history.

(56) References Cited

U.S. PATENT DOCUMENTS 6,203,689 B1    3/2001    Kim et al.

FOREIGN PATENT DOCUMENTS

| CN | 101224551 | 7/2008 |
|---|---|---|
| CN | 104108053 | 10/2014 |

(Continued)

OTHER PUBLICATIONS

Machine translation of CN 106424733. (Year: 2017).*

(Continued)

*Primary Examiner* — Xiaowei Su
(74) *Attorney, Agent, or Firm* — Grossman, Tucker, Perreault & Pfleger, PLLC

(57) ABSTRACT

A polishing method for an inner wall of a hollow metal part, including: firstly, placing a coaxial cathode in an inner hole of a metal part when a metal part model is designed, and printing the metal part model and the coaxial cathode together; then, sealing two ends of an inner hole cavity of the metal part by using a light curing part, fixing the coaxial cathode, filling the cavity with a polishing solution, and performing polishing treatment by using an electrochemical polishing method; and finally, reversing an electrode to break the coaxial cathode and take out the broken coaxial cathode to obtain a polished metal part. The polishing of a complex-shaped inner hole of a 3D-printed metal part is realized, the defect that an inner hole of a 3D-printed metal part with a complex-shaped hollow part cannot be polished by using a traditional machining method is overcome, the problem that an inner wall of a metal part polished by using an electrochemical method is non-uniform is solved, the surface quality of the inner hole of the 3D-printed metal part with the complex-shaped hollow part is improved, and the application prospect and postprocessing technology of the 3D-printed metal part are expanded.

2 Claims, 2 Drawing Sheets

(51) Int. Cl.
*C25F 7/00* (2006.01)
*B33Y 40/20* (2020.01)

(56) References Cited

FOREIGN PATENT DOCUMENTS

| | | |
|---|---|---|
| CN | 105448817 | 3/2016 |
| CN | 106424733 | 2/2017 |
| CN | 206263257 | 6/2017 |
| CN | 107350566 | 11/2017 |
| CN | 108179461 | 6/2018 |
| JP | 11-100700 | 4/1999 |

OTHER PUBLICATIONS

International Search Report from corresponding PCT Appln. No. PCT/CN2018/115884, dated Dec. 27, 2018.
Written Opinion from corresponding PCT Appln. No. PCT/CN2018/115884, dated Dec. 27, 2018.

* cited by examiner

POLISHING METHOD FOR INNER WALL OF HOLLOW METAL PART

FIELD

The present disclosure belongs to the technical field of polishing treatment for metal additive manufacturing and specifically relates to a polishing method for an inner wall of a hollow metal part, and the polishing method adopts an electrochemical polishing method for polishing an inner wall of a hollow part of a 3D-printed hollow metal part and is particularly suitable for a metal part with a complex-shaped hollow part.

BACKGROUND

In the current manufacturing industry, metal additive manufacturing is mainly realized by three technologies including a selective laser melting technology (SLM), an electron beam melting technology (EBM) and a laser cladding technology (LMD), wherein the SLM and the EBM can be applied to the machining of a metal part with a complex-shaped hollow structure, however, the surface quality of the metal part printed by using the SLM and the EBM does not reach up to the level of direct application, and such a problem can be solved by performing polishing treatment on the surface of the metal part; polishing refers to a machining method for obtaining a bright and smooth surface by reducing the surface roughness of a workpiece under a mechanical, chemical or electrochemical action and means the finishing for the surface of the workpiece by utilizing a polishing tool and abrasive particles or other polishing media; for example, in a polishing method for a steering worm of a car steering wheel disclosed in the Chinese patent No. 201710774022.7, the worm is polished by a polishing machine, when a to-be-polished worm is clamped by a polishing assembly, the polishing assembly drives the worm to rotate, the polishing assembly is arranged on a revolution wheel, the revolution wheel drives the polishing assembly to rotate for 360 DEG along the shaft axis of the revolution wheel, and the direction that the polishing assembly drives the worm to rotate is changed once every time when the revolution wheel rotates 180 DEG in a process that the polishing assembly rotates with the revolution wheel; a technical process of a metal surface plasma and pulse discharge combined polishing method disclosed in the Chinese patent No. 201410275439.5 includes: firstly, generating a plasma magnetic fluid channel by adopting radio frequency oscillation, performing pulse discharge on a raised part on a to-be-polished metal surface, and making a generated plasma arc pass through the magnetic fluid channel to obtain a strength and density enhanced plasma arc, bombarding the raised part on the metal surface by using the enhanced plasma arc to form an anode spot on the part, then, removing the anode spot by evaporation, and regulating the discharge polarity to remove the brightening of the raised part and realize the polishing on the position; in a high-speed polishing method for a solid rare-earth metal of a diamond film disclosed in the Chinese patent No. 200810010281.3, a polishing tool is a solid rare earth metal polishing disk (or a polishing tool), friction heat generated by the relative movement of the polishing disk (or the polishing tool) and the diamond film forms a thermal chemical reaction environment on a contact interface of the diamond film and the solid rare earth metal polishing disk, carbon atoms on a convex point on a polished surface of the diamond film are corroded to polish the diamond film, and the polishing process is performed in an ordinary atmospheric environment, so that a planar diamond film and any curved diamond film can be polished, wherein the curved diamond film may be polished by adopting two methods including an enveloping method and a molding method, a bulb polishing rod molded by solid rare earth metal is adopted as a polishing tool in the enveloping method, and a polishing head molded by solid rare earth metal is used as a polishing tool in the molding method; a method for electrochemically polishing a metal interconnection wafer structure disclosed in the Chinese patent No. 201410513538.2 includes: step 1, electrochemically polishing parts of wafers in wafer products to obtain average time T0 required for polishing a qualified wafer; step 2, measuring a thickness previous value D0 of any one wafer O in the wafer products, and comparing the thickness previous value D0 with a previous value target value D; step 3, electrochemically polishing the wafer O; step 4, cleaning the wafer O; step 5, measuring a thickness posterior value D1 of the wafer O; and step 6, judging whether the thickness posterior value D1 of the wafer O meets a requirement of a posterior value target value D', reworking the wafer O or delivering the wafer O to a subsequent CMP module, wherein the time T required for polishing the wafer O is equal to T0+[(D0−D)/(K*RR)]*60, RR is a polishing rate, K is a constant coefficient, wherein the polishing rate RR is reduced with the increment of the number of batches of the polished wafer products, and the constant coefficient K is decided by the shapes of the wafer products; in a method for electrochemically polishing a metal object disclosed in the Chinese patent No. 201180056582.X, the metal object is particularly selected from copper (Cu), zinc (Zn), silver (Ag), tin (Sn), gold (Au), platinum (Pt) and an alloy containing at least one of the metals, the method lies in that, the metal object is conductively connected with an anode and is immersed into an electrolyte solution together with a cathode, then, a voltage is applied to an electrode, the electrolyte solution contains the following components or is composed of all of the following components by mass: (a) 2-50 wt. % of at least one ethoxylated alcohol; (b) 2-50 wt. % of at least one substance selected from sulfonic acid and sulfonate; (c) 0.2-10% of at least one inorganic acid; (d) 6-50 wt. % of at least one liquid hydrocarbon; and (e) 5-90 wt. % of water, wherein the pH value of the electrolyte solution is at least 1; electrochemical polishing involved in the above patents is also known as electrolytic polishing and is a polishing method for achieving the effect of increasing the brightness of the surface of the workpiece by simultaneously immersing a polished workpiece as an anode and an insoluble metal as a cathode into an electrolytic cell and introducing a direct current to generate selective anodic dissolution, the principle of electrolytic polishing is that metal ions separated from the workpiece and phosphoric acid in a polishing solution form a layer of phosphate film to be adsorbed on the surface of the workpiece, the mucous film is relatively thin at a raised part and relatively thick at a recessed part, dissolution speed at the raised part is high due to high current density, a convex and a concave are continuously changed with the flow of the mucous film, the rough surface is gradually leveled, and the electrolytic polishing has the three advantages: (1) inside and outside colors and luster are consistent, the lasting luster is kept, and the recessed part which cannot be polished by mechanical polishing can also be leveled; (2) the production efficiency is high, and the cost is low; and (3) the corrosion resistance of the surface of the workpiece is improved; however, an inner hole of a metal part with a complex-shaped hollow structure cannot be polished by using a traditional polishing method or the polishing methods involved in the above-mentioned patents, and the problem of the finish degree of the inner hole of the metal part with the complex-shaped hollow structure cannot be solved, so that the application of the metal part with the complex-shaped hollow structure is limited, meanwhile, the application scope of a 3D printing technology is also restricted. Therefore, the search and design of a polishing method capable of meeting a requirement on the finish degree of the inner hole of the 3D-printed metal part with the complex-shaped hollow structure have social and economic values.

SUMMARY

The present disclosure aims at researching and designing a polishing method capable of meeting a requirement on the finish degree of an inner hole of a 3D-printed metal part with a complex-shaped hollow structure to overcome the defect that an inner wall of a hollow complex-shaped metal part cannot be polished by using a traditional machining method and the problem that an inner wall of a metal part polished by using an electrochemical method is non-uniform in the prior art.

In order to achieve the above-mentioned purpose, a technical process of a polishing method for an inner wall of a hollow metal part in the present disclosure includes three steps in total: designing and printing, sealing and polishing as well as reversing and breaking:

(1) designing and printing: adding a coaxial cathode model in an inner hole of a metal part model when designing the metal part model, the coaxial cathode model is corresponding to the inner hole in shape and size and provided with 1-3 breakable structures in the middle part thereof; and printing a metal part and a coaxial cathode together by using a 3D printer to complete the designing of the metal part model and the coaxial cathode model and the printing of the metal part and the coaxial cathode;

(2) sealing and polishing: sealing two ends of the inner hole of the metal part by using a light curing sealing ring adapted to the inner hole of the metal part in shape, fixing the coaxial cathode, introducing a polishing solution into the sealed inner hole serving as an electrochemical polishing tank, taking the coaxial cathode as a cathode and the surface of the inner hole of the metal part as an anode, and performing electrochemical polishing on the surface of the inner hole of the metal part by virtue of a hollow structure of the metal part; and (3) reversing and breaking: reversing the electrodes, taking the coaxial cathode as the anode and the surface of the inner hole of the metal part as the cathode, fusing the breakable structures of the coaxial cathode, removing the light curing sealing ring, discharging the polishing solution, and taking the broken coaxial cathode out of the inner hole of the metal part to complete reversing and breaking, and realizing the polishing of the surface of the inner hole of the metal part.

The parts and the coaxial cathode involved in the present disclosure may be each made of a traditional metal additive manufacturing material such as an iron-based material, a nickel-based material and a titanium-based material; the size of the coaxial cathode may be selected according to the size of the inner hole of the part; the breakable structures are reticular supporting structures; the light curing sealing ring is generally made of light curing resin, and the size of the light curing sealing ring is selected according to the size of the inner hole of the metal part; and the polishing solution may be selected according to a metal material required to be polished.

Compared with the prior art, the polishing method includes: firstly, placing the coaxial cathode in the inner hole of the metal part when the metal part model is designed, and printing the metal part model and the coaxial cathode together; then, sealing two ends of an inner hole cavity of the metal part by using a light curing part, fixing the coaxial cathode, filling the cavity with the polishing solution, and performing polishing treatment by using the electrochemical polishing method; and finally, reversing the electrode to break the coaxial cathode and take out the broken coaxial cathode to obtain a polished metal part. The polishing of a complex-shaped inner hole of a 3D-printed metal part is realized, the defect that an inner hole of a 3D-printed hollow complex-shaped metal part cannot be polished by using a traditional machining method is overcome, the problem that an inner wall of a metal part polished by using an electrochemical method is non-uniform is solved, the surface quality of the inner hole of the 3D-printed hollow complex-shaped metal part is improved, and the application prospect and postprocessing technology of the 3D-printed metal part are expanded.

DETAILED DESCRIPTION

Figure 1:
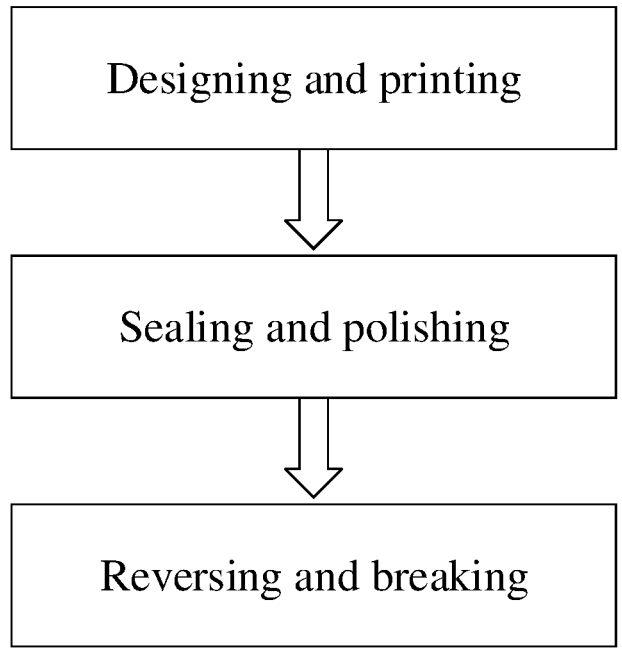
FIG. 1 is a block diagram of a technical process of the present disclosure.
Figures 2, 3:
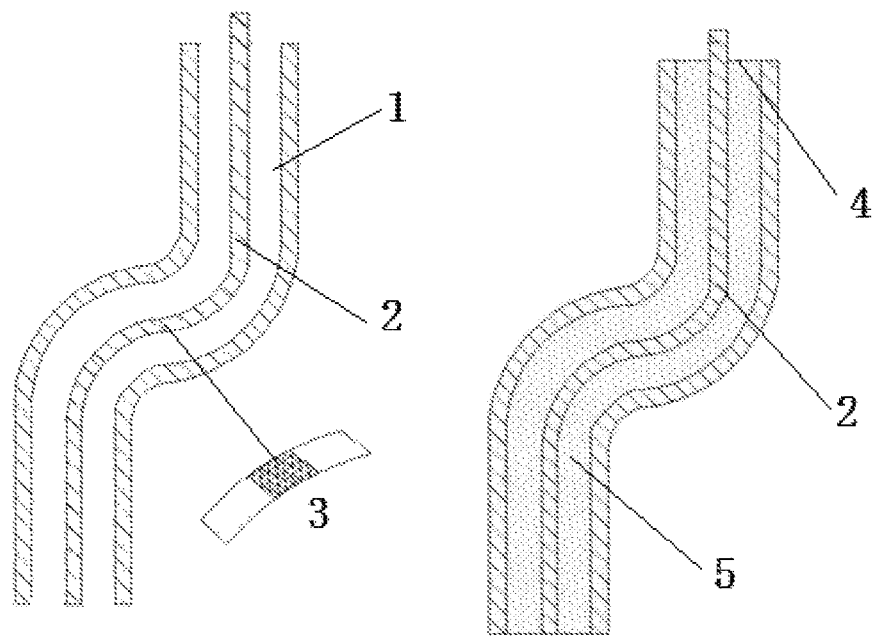
FIG. 2 is a schematic diagram of a principle in step (1) involved in the present disclosure.
FIG. 3 is a schematic diagram of a principle in step (2) involved in the present disclosure.
Figure 4:
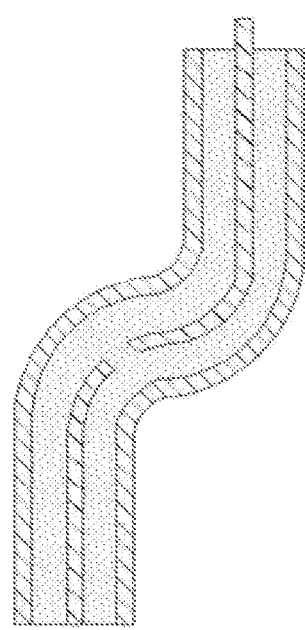
FIG. 4 is a schematic diagram of a fusing principle in step (3) involved in the present disclosure.
Figure 5:
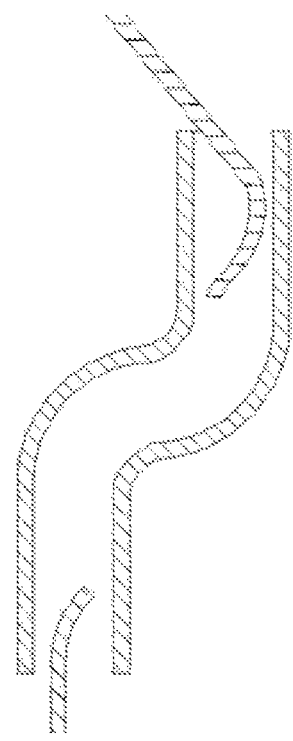
FIG. 5 is a schematic diagram of a breaking principle in step (3) involved in the present disclosure.

The present disclosure is further described below with embodiments in combination with the accompanying drawings.

Embodiment 1

A technical process of a polishing method for an inner wall of a hollow metal part provided by the present disclosure includes three steps in total: designing and printing, sealing and polishing as well as reversing and breaking:

(1) designing and printing: when a metal part model is designed, a coaxial cathode model corresponding to an inner hole 1 of a metal part model in shape and size is added in the inner hole 1, 1-3 breaking points 3 with reticular structures are arranged in the middle of a coaxial cathode 2, and the metal part and the coaxial cathode 2 are printed together by using a 3D printer to complete the designing of the metal part model and the coaxial cathode model and the printing of the metal part and the coaxial cathode 2;

(2) sealing and polishing: the metal part and the coaxial cathode 2 are cut off together, powder inside the metal part is cleared, two ends of the inner hole 1 of the metal part are sealed by a light curing sealing ring 4 adapted to the inner hole of the metal part in shape, the coaxial cathode 2 is fixed, a polishing solution 5 is introduced into the sealed inner hole serving as an electrochemical polishing tank, the coaxial cathode 2 is connected to a cathode of a power source, the surface of the inner hole 1 of the metal part is connected to an anode of the power source, and electrochemical polishing is performed on the surface of the inner hole 1 of the metal part by virtue of a hollow structure of the metal part; and (3) reversing and breaking: the electrodes is reversed, the coaxial cathode 2 is connected to the anode of the power source, the surface of the inner hole 1 of the metal part is connected to the cathode of the power source, the breaking points 3 of the coaxial cathode 2 are fused, the light curing sealing ring 4 is removed, the polishing solution 5 is discharged, and the coaxial cathode 2 broken by corrosion is taken out of the inner hole 1 of the metal part to complete reversing and breaking and realize the polishing of the surface of the inner hole 1 of the metal part.

The parts and the coaxial cathode involved in the present disclosure may be each made of a traditional metal additive manufacturing material such as an iron-based material, a nickel-based material and a titanium-based material; the size of the coaxial cathode may be selected according to the size of the inner hole of the part; the breakable structures are reticular supporting structures; the light curing sealing ring is generally made of light curing resin, and the size of the light curing sealing ring is selected according to the size of the inner hole of the metal part; and the polishing solution may be selected according to a metal material required to be polished.

Although several embodiments of the present disclosure have been given herein, the skilled in the art should understand that the embodiments described herein can be changed without departing from the spirit of the present disclosure. The above-mentioned embodiments are merely exemplary, but should not be used as a limitation to the scope of the present disclosure.

What is claimed is:

1. A polishing method for an inner wall of a hollow metal part, wherein comprising three steps in total: designing and printing, sealing and polishing as well as reversing and breaking:

(1) designing and printing: adding a coaxial cathode model in an inner hole of a metal part model when designing the metal part model, the coaxial cathode model is corresponding to the inner hole in shape and size and provided with 1-3 breakable structures in the middle part thereof, wherein the breakable structures form breaking points;

and printing a metal part and a coaxial cathode together by using a 3D printer to complete the designing of the metal part model and the coaxial cathode model and the printing of the metal part and the coaxial cathode;

(2) sealing and polishing: sealing two ends of the inner hole of the metal part by using a light curing sealing ring adapted to the inner hole of the metal part in shape, fixing the coaxial cathode, introducing a polishing solution into the sealed inner hole serving as an electrochemical polishing tank, taking the coaxial cathode as a cathode and the metal part as an anode, and performing electrochemical polishing on an inner surface of the metal part; and (3) reversing and breaking: reversing the electrodes, taking the coaxial cathode as the anode and the metal part as the cathode, fusing the breakable structures of the coaxial cathode to break the coaxial cathode, removing the light curing sealing ring, discharging the polishing solution, and taking the broken coaxial cathode out of the inner hole of the metal part to complete reversing and breaking, and realizing the polishing of the inner surface of the metal part.

2. The polishing method for the inner wall of the hollow metal part according to claim 1, wherein the coaxial cathode is made of an iron-based material, a nickel-based material or a titanium-based material; the size of the coaxial cathode is selected according to the size of the inner hole of the metal part; the breakable structures are reticular supporting structures; the light curing sealing ring is made of light curing resin, and the size of the light curing sealing ring is selected according to the size of the inner hole of the metal part; and the polishing solution is selected according to a metal material required to be polished.

* * * * *